Figure 1:
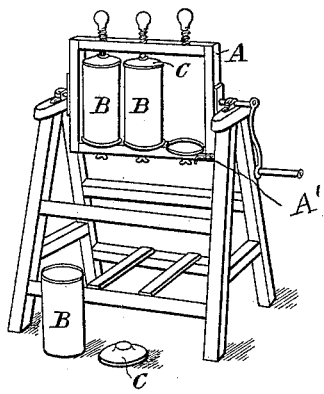

(No Model.) 2 Sheets—Sheet 1.

W. H. WELLS.
CHURN.

No. 423,362. Patented Mar. 11, 1890.

Witnesses
Baltus DeLong.
C. M. Brooke.

Inventor.
William Howley Wells.
By his Atty's.
Baldwin Davidson & Wight.

N. PETERS, Photo-Lithographer, Washington, D. C.

(No Model.) 2 Sheets—Sheet 2.

W. H. WELLS.
CHURN.

No. 423,362. Patented Mar. 11, 1890.

Witnesses
Baltus DeLong
C. W. Brooke

Inventor
William Howley Wells.
By his Attys.
Baldwin Davidson & Wight

UNITED STATES PATENT OFFICE.

WILLIAM HOWLEY WELLS, OF EVERSHOT, COUNTY OF DORSET, ENGLAND.

CHURN.

SPECIFICATION forming part of Letters Patent No. 423,362, dated March 11, 1890.

Application filed May 8, 1889. Serial No. 310,058. (No model.)

*To all whom it may concern:*

Be it known that I, WILLIAM HOWLEY WELLS, estate agent, a subject of the Queen of Great Britain, residing at Evershot, in the county of Dorset, England, have invented a certain new and useful Improvement in Churns, of which the following is a specification.

The object of my invention is to construct churns in such manner that the bulk of milk or cream to be churned, instead of being churned in a single vessel, as heretofore, may be divided and churned in vessels of moderate and convenient dimensions, so that varying quantities of milk or cream can be churned in the same churn with equal efficiency, and also to enable the cream from different milkings or from individual cows to be churned separately in the same churn.

The vessels in which the milk or cream is to be agitated I make in the form of simple vessels—such as pails, barrels, or jars of glass or metal or other suitable material, but preferably of glass—and with an uncontracted or practically uncontracted mouth or opening at the top, although when the vessels or jars are of large size it may be convenient to more or less contract the mouth, but not to such an extent as to hinder a man's hand and arm being readily passed into them when they are to be cleaned. I place one, two, or more such jars into a rack or frame, according to the quantity of milk or cream to be churned. Each jar or vessel I close at the top by a lid, preferably pressed down onto it by a screw or similar contrivance carried by the frame, each jar being preferably closed by a separate lid, which also serves to hold it in place in the frame. To the frame I impart a revolving or oscillating to-and-fro movement to agitate the milk or cream in the jar or jars to effect the churning, each jar being only partially filled with milk or cream. With churns of large size one end of each jar might be of metal, wood, earthenware, or other non-transparent material and the other end of glass, so that the glass jars may not be of inconvenient size, or both might be of glass or metal meeting at the connections. The two parts of the jar might be held together, when placed into a frame, by means of a screw, as above described, or they might be held together by other convenient form of fastening.

One advantage of making the jars of glass or partly of glass is that the progress of the churning can be seen without opening the jars. They can also readily be kept clean.

By using agitating-frames carrying two or more jars or vessels to contain the cream or milk the cream or milk can be churned with equal efficiency as when there is a large quantity, as then only a single vessel need be used instead of two or more, and very simply-formed vessels can thus be used for churning.

Figure 2:
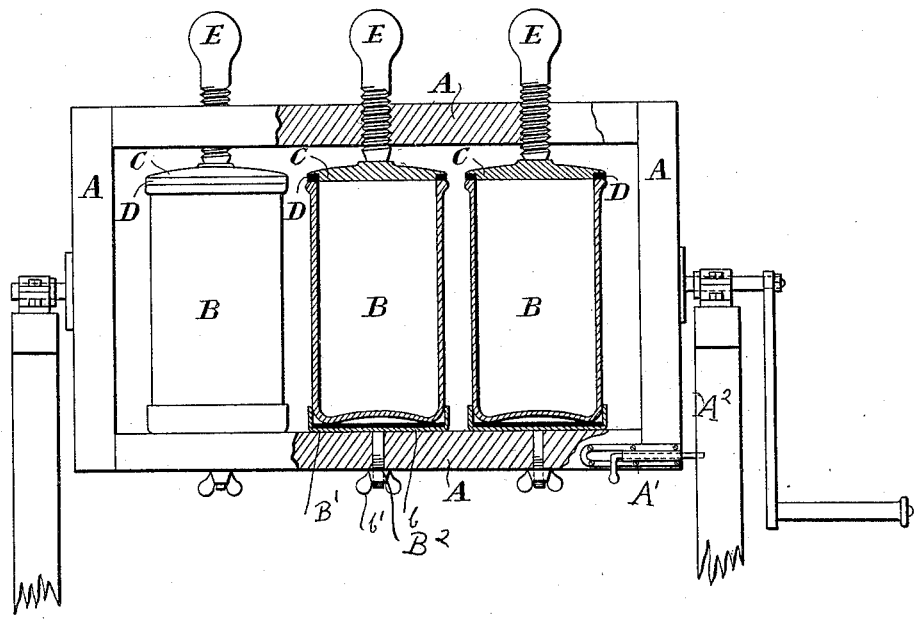
Figure 7:
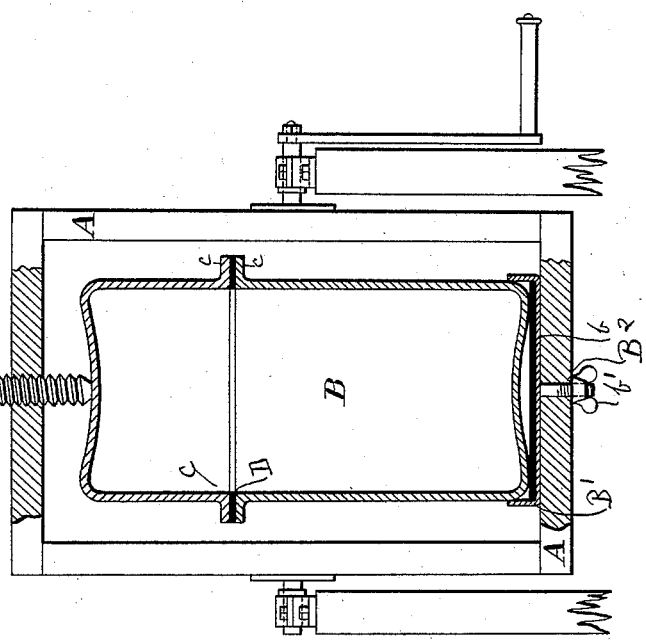
Figure 4:
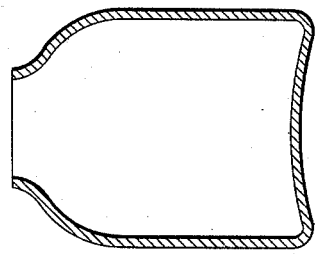
Figure 6:
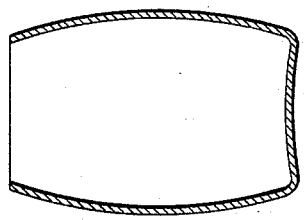
Figure 3:
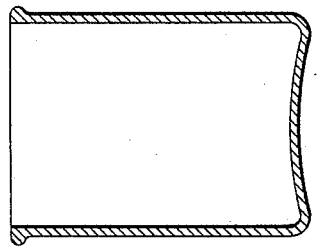
Figure 5:
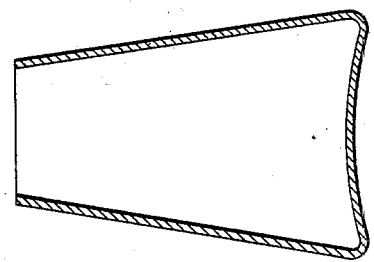

Figure 1 of the drawings hereunto annexed is a perspective view of a churn constructed according to my invention. Fig. 2 is an elevation, partly in section, of the revolving frame of the churn. Figs. 3, 4, 5, and 6 show sections of various forms of vessel which may be carried within the frame. These are shown merely as examples, and not as being the only forms that can be used. Fig. 7 is a vertical section of a modification of the churn in which the jar or containing-vessel is in two parts, meeting together at a point intermediate of the two ends.

In Figs. 1 and 2, A is a rectangular frame capable of being revolved. B B are the jars or containing-vessels carried in it. C C are the lids of the jars, which may be of metal or glass or other suitable material. D D are elastic rings carried by the lids to come against the top rim of the jars and make tight joints. E E are screws carried by the frame for pressing the lids against the top of the jars, thereby closing the jars at the same time that they hold the jars in place. At their lower ends the jars rest in flanged holders B', the bottoms of which are covered with elastic material $b$. Bolts $B^2$, secured to the holders B', extend through the frame A, and the outer ends are screw-threaded and provided with tightening-nuts $b'$. The frame A is provided with a sliding bolt A', which enters a recess in one of the standards $A^2$ to hold the frame in a vertical position when it is stationary. The bolts $B^2$, which secure the holders B' to the frame, are free to revolve with the holders relatively to the frame when the nuts $b'$ are loosened—that is, the holders with the bolts may be turned in the frame or adjusted so that the elastic material $b$ may be adjusted relatively to the bottom of the jar to compensate for wear and insure a tight and steady connection.

Each vessel should be filled about one-third full with milk or cream and the frame revolved at a speed, say, of about seventy or eighty revolutions a minute. The jars being of glass the progress of the churning can, as above mentioned, be readily seen without opening them. The drawings show three jars as being carried in the frame; but the frame may be constructed to carry any desired number.

The frame may be of wood, as shown; or it may be of metal or other suitable material, as preferred. In place also of the frame being provided with axes at its ends, upon which it can be revolved, it might be suspended by links and an oscillatory to-and-fro motion given to it by a crank or otherwise, either vertically or horizontally.

In the modification shown at Fig. 7 the jar is in two parts, meeting together at a point intermediate of its length. Both parts may be of glass, or one may be of glass and the other of metal, as preferred. The adjacent edges of the two parts of the jar are flanged at $c$, and between them is interposed a ring D of elastic material.

What I claim is—

1. The combination, substantially as hereinbefore set forth, of a frame, standards in which the frame is journaled, a flanged holder B′, elastic material $b$ in the holder, a bolt B², secured to the holder and pivotally connected with the frame, a tightening-nut $b'$ therefor, the jar fitting in the flanged holder, the jar-cover, and a screw working in the frame for clamping the cover to the jar.

2. The combination, substantially as hereinbefore set forth, of the rectangular frame, the standards in which it is journaled, a bolt for locking the frame to the standards, a series of flanged holders B′, elastic packing material $b$ therein, bolts B², pivotally connected with the frame and provided with tightening-nuts for securing the holders to the frame, a series of jars having their lower ends seated in the holders, a series of covers—one for each jar—packing-rings interposed between the covers and the upper edges of the jars, and a series of clamping-screws—one for each cover—working in the rectangular frame.

WILLIAM HOWLEY WELLS.

Witnesses:
 ALF. RAYNER,
  *Weymouth, Dorset.*
 CHAS. BROWN,
  *Weymouth.*